J. JONAS.
APPARATUS FOR REGULATING THE VOLTAGE OF METAL VAPOR RECTIFIER INSTALLATIONS.
APPLICATION FILED OCT. 4, 1920.
1,434,346.
Patented Oct. 31, 1922.
3 SHEETS—SHEET 1.
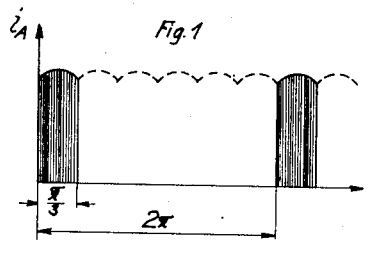
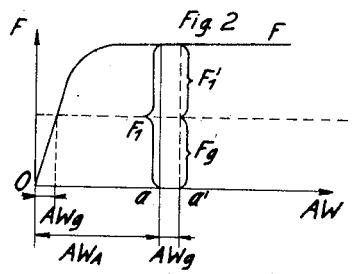
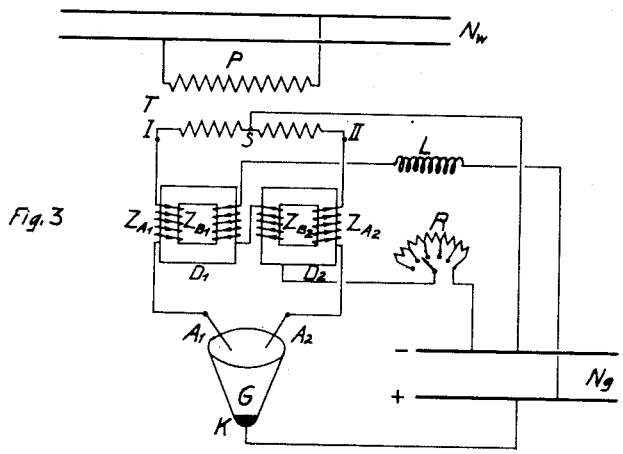
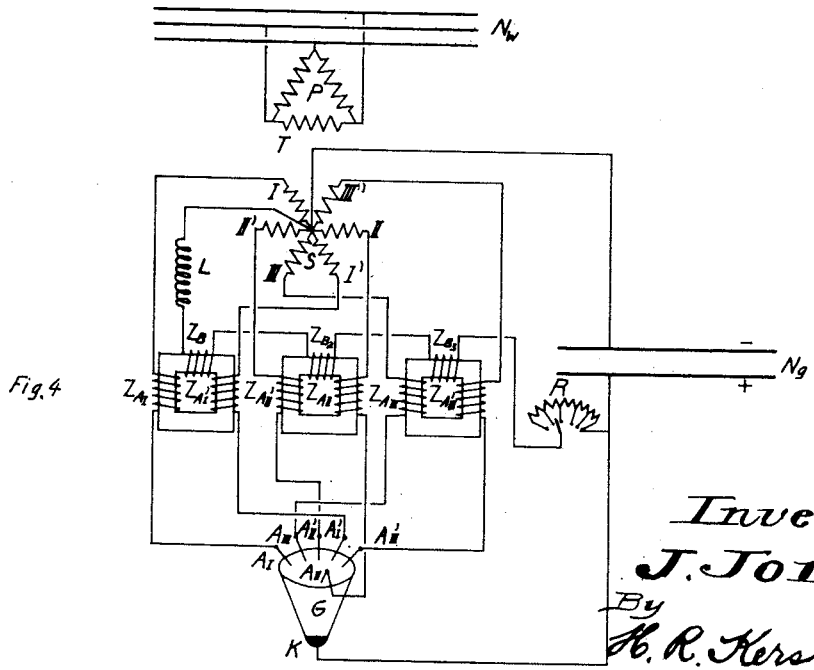
Inventor
J. Jonas
By
H. R. Kerslake
Attorney J. JONAS.
APPARATUS FOR REGULATING THE VOLTAGE OF METAL VAPOR RECTIFIER INSTALLATIONS.
APPLICATION FILED OCT. 4, 1920.

1,434,346.

Patented Oct. 31, 1922.

Inventor
J. Jonas
By H. R. Kerslake
Attorney

J. JONAS.
APPARATUS FOR REGULATING THE VOLTAGE OF METAL VAPOR RECTIFIER INSTALLATIONS.
APPLICATION FILED OCT. 4, 1920.

1,434,346.

Patented Oct. 31, 1922.
3 SHEETS—SHEET 3.

Inventor
J. Jonas,
By H. R. Kirslake
Attorney

Patented Oct. 31, 1922.

1,434,346

UNITED STATES PATENT OFFICE.

JULIUS JONAS, OF BADEN, SWITZERLAND, ASSIGNOR TO AKTIENGESELLSCHAFT BROWN, BOVERI & CIE., OF BADEN, SWITZERLAND.

APPARATUS FOR REGULATING THE VOLTAGE OF METAL VAPOR-RECTIFIER INSTALLATIONS.

Application filed October 4, 1920. Serial No. 414,696.

*To all whom it may concern:*

Be it known that I, JULIUS JONAS, a citizen of the German Realm, residing at Meicrhof, Baden, Switzerland, have invented certain new and useful Improvements in Apparatus for Regulating the Voltage of Metal Vapor-Rectifier Installations (for which I have filed applications in Switzerland, No. 92,280, and dated 22nd September, 1919, and in Germany, No. 339,182, and dated 25th September, 1919), of which the following is a specification.

In the anode circuit of metal vapor rectifiers there are frequently included choking coils that serve either for preventing the extinction of single arcs in the rectifier, or for producing a uniform load of parallel-working anodes or rectifiers.

The present invention has for its object to utilize these choking coils for a further purpose, namely for regulating the voltage of the rectifier installations. Generally these choking coils are not very suitable for regulating the voltage of the rectifier, because their voltage is solely a function of the current, that is, of the anode current which is a partial current of the main current taken from the rectifier. If it were desired to render the voltage regulation as independent as possible of the main current, it would be necessary to restrict the influence of the main current varying with the load, to the voltage drop by means of the throttling coil by so dimensioning the latter that it will become highly saturated at a small number of turns and at a low value of the main current. In this case a relatively large range of current would give an approximately constant voltage drop proportionate to the number of turns of the choking coil, so that the voltage of the rectifier could be regulated as desired by varying the number of turns of the choking coil. But this regulation would, for several reasons, still be incomplete because the cutting-out of turns allows only of a step-by-step or jerky regulation of the voltage, and the independence of the voltage upon the load by may of saturation by the main current itself, can be achieved only to an incomplete extent.

Certainly in this case, especially in the case of polyphase rectifiers wherein the anode current has a course similar to that shown in Fig. 1, the conditions are more favourable than in the case of a sinusoidal course of the current curve, because the momentary rise of the current to almost its amplitude-value, favours the influence of the saturation. In reality however, the influence of the inductivity of the circuit causes a certain flattening of the current curve, whereby the dependence of the choked-off voltage upon the main current is not entirely eliminated.

According to the present invention, the regulation of the voltage is produced, not by the influence of the main current, but by an additional excitation winding fed from a source of constant direct current. For this the conditions, in the case of these choking coils fed by undulating current, are particularly favourable in so far as the undulating current can be magnetized only in one direction, and the direct current excitation can be adjusted to act in the same direction. It is however still necessary that the reaction of the alternating current upon the direct current excitation, shall be eliminated by special means, for instance by inserting a self induction in the circuit of the direct current excitation.

Whereas generally the insertion of a choking coil (fed with alternating current) with a superposed direct current field in alternating current installations, necessitates the provision of a special source of direct current, and consequently increases the complication and cost of the installation, the said provision can be avoided in rectifier installations, by utilizing according to this invention the rectifier voltage itself for effecting its own regulation. This method constitutes an important advantage of the application of this principle to rectifier installations.

The present invention consists therefore in an apparatus for regulating the voltage of metal vapor rectifiers by means of choking coils inserted in the current circuit of the anodes. According to this apparatus each choking coil, in addition to being excited by the anode current, is also excited by a direct current voltage in the same direction as by the anode current, and the regulation of the rectifier voltage is effected by regulating this direct current excitation. With this method of regulation, it is an advantage if the choking coils are near their point of saturation even with relatively small anode currents.

Figure 1 represents the anode current course of a polyphase rectifier;

Figure 2 represents a curve showing the relation between ampere turns and corresponding field of the choking coil;

Figures 3 and 4 represent regulating arrangements suitable for single-phase and three-phase currents respectively;

Figure 5:
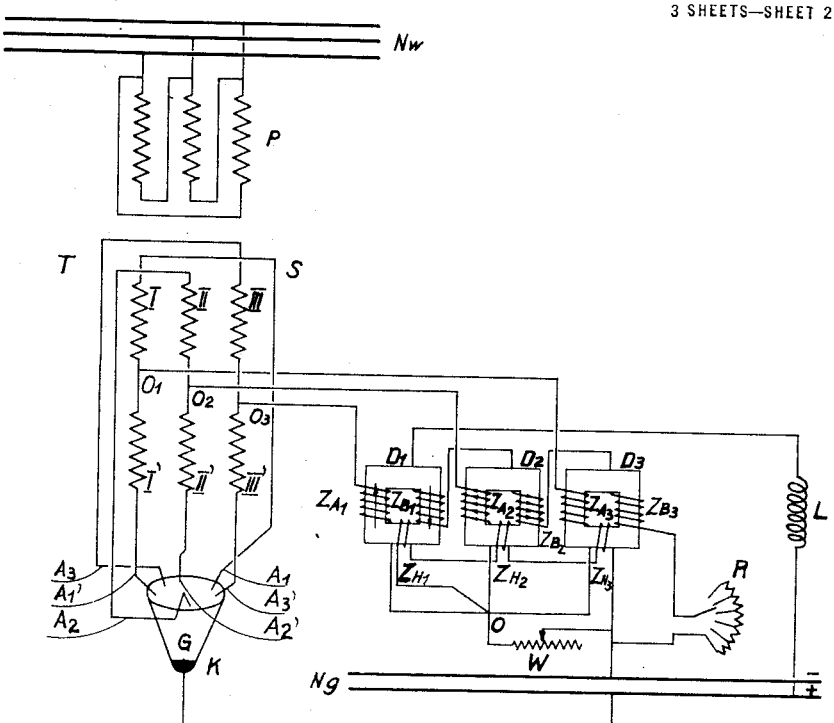
Figures 5, 6, 7 and 9 represent modified regulating arrangements of the windings and cores of the choking coils for three-phase currents.

In Fig. 2:—F is the field curve of the choking coil; $AW_A$ are the exciting ampere turns of the anode current. For a given current and a given number of turns $Z_1$ of the choking coil, let $AW_A = oa$.

To this number of ampere turns there would be a corresponding field $F_1$; and the E. M. F. induced in the choking coil is proportionate to the expression $F_1 . Z_1$.

If now by a constant direct current excitation $AW_g$ a direct current field $F_g$ be generated in the choking coil, then the intervention of the ampere turns $AW_A$ will cause the resulting field to exceed the value $F_1$ only by an inconsiderable amount during the saturation, and the field, $F_g + F_1$, corresponding to the value $AW_g + AW_A = oa'$, will be approximately equal to $F_1$; whilst the E. M. F. induced in the throttling coil is still only proportional to the expression $F'_1 . Z_1$.

Thus the intervention of a relatively small direct current excitation produces a very considerable variation in the choking voltage, and thereby the total voltage is regulated. Owing to the high saturation the increase in the anode current has no material influence upon the voltage conditions.

Fig. 3 illustrates an arrangement suitable for monophase current, with reference to which the improved apparatus will now be described. T is a monophase transformer with its primary winding P and secondary winding S. The anode currents supplied to the rectifier G are taken from the terminals I and II of the secondary winding. These currents flow through the windings $Z_{A_1}$ and $Z_{A_2}$ of the choking coils $D_1$ and $D_2$ to the anodes $A_1$ and $A_2$ of the rectifier G, whose cathode K feeds the positive lead of the direct current external circuit $N_g$, whereas the negative lead of this circuit is electrically connected to the centre of the secondary winding S. The two choking coils $D_1$ and $D_2$ are, according to the present invention, also excited each by a winding $Z_{B_1}$ and $Z_{B_2}$ respectively; these windings being fed from the circuit $N_g$ through the self-induction L and the regulating resistance R in series-connection, and acting to excite the choking coils in the same sense as $Z_{A_1}$ and $Z_{A_2}$.

Now for the purpose of regulating the voltage of the rectifiers and therefore also that of the circuit $N_g$, the contact of the regulating resistance R is shifted in the desired sense. The choking coil voltage is thereby increased or diminished, and since it is connected in series with the transformer voltage, the circuit voltage will be correspondingly diminished or increased.

When a separate choking coil is employed for each anode, this process has still the great drawback that the choking coils are relatively large, because the anode current flows only during a fraction of a period. A very much better utilization of the choking coil can be effected by providing a choking coil for each of a number of groups of anodes of different phases, and preferably arranging the phases of each group at equal time-distances apart.

The improved apparatus then consists in this that the secondary phases of a transformer feeding the rectifier, allotted to each choking coil, are so arranged as to excite in groups of at least two phases, the choking coil in the same sense, and that simultaneously the choking coils are excited by a direct current voltage in the same sense as by the anode currents, and the regulation of the direct current voltage is effected by regulating this direct current excitation.

This will be understood from Fig. 4 which relates to a three-phase system. $N_w$ is a three-phase net; T is a transformer with the primary winding P and the six-phase secondary winding S. The terminals of the six phases are marked I, I', II, II', III, III'. From these terminals, leads pass through the exciting windings $Z_{AI}$, $Z_{AI'}$, $Z_{AII}$, $Z_{AII'}$, $Z_{AIII}$, $Z_{AIII'}$ of the throttling coils $D_1$, $D_2$, $D_3$, to the anodes $A_I$, $A_{I'}$, $A_{II}$, $A_{II'}$, $A_{III}$, $A_{III'}$ of the rectifier G whose cathode is connected to the positive lead of the direct current circuit $N_g$. The negative lead of the circuit $N_g$ is connected to the zero point $o$ of the secondary winding S. Of the exciting windings $Z_{AI}$ $Z_{AI'}$ . . . , those marked $Z_{A_1}$ and $Z_{A_1'}$ lie on choking coil $D_1$ and they excite the latter in the same sense;

$Z_{AII}$ and $Z_{AII'}$ lie on choking coil $D_2$, and they excite the latter in the same sense;

$Z_{AIII}$ and $Z_{AIII'}$ lie on choking coil $D_3$, and they excite the latter in the same sense.

Thus, the choking coils $D_1$, $D_2$, $D_3$, are allotted each to a group of two secondary phases whose vectors are distant 180° from each other. For regulating the voltage, the choking coils carry also the direct current exciting windings $Z_{B_1}$ $Z_{B_2}$ and $Z_{B_3}$ which are arranged in series with one another, and are connected through the self-induction L and the regulating resistance R to the direct current voltage of the installation. The direct current excitation must magnetize in the same sense as does the excitation by the anode currents. Consequently the rectifier voltage is regulated by operating the regulating resistance R.

The improved process allows also of effecting in a simple manner a compounding of the rectifier voltage, by exciting the choking coils by the main current of the rectifier (in addition to the direct current voltage) likewise in the same sense as by the anode current. This is equivalent to an automatic increase in the direct current excitation of the choking coils in dependence on the main current, so that with a high saturation of the choking coils the induced E. M. F. of the choking coils diminishes with an increasing load. By this means however the rectifier voltage increases accordingly, and the increase in the voltage drop is cancelled by the compounding.

A method of compounding is illustrated by Fig. 5 which however differs also in other respects from the example shown in Fig. 4. Whereas in Fig. 4 each anode current of a phase group flows through an exciting winding situated on the respective choking coil, there is provided in Fig. 5, only a single exciting winding on each choking coil for the anode currents; said single winding therefore carries those anode currents of the respective group that do not coincide with one another in point of time. This simplification is produced by providing each secondary phase group with its own zero point, and connecting these group zero points each through an exciting winding of the allotted choking coils to the common zero point of the secondary system.

Thus in Fig. 5:—

$N_w$ is a three-phase net, and

T is a transformer with a primary winding P and a six-phase secondary winding S.

Of the six phases, the phases I, I′ constitute a group with the zero point $o_1$; II, II′ constitute a group with the zero point $o_2$, and III, III′ constitute a group with the zero point $o_3$.

Leads pass from these zero points, $o_1$, $o_2$, $o_3$, through the exciting windings $Z_{A_1}$, $Z_{A_2}$ and $Z_{A_3}$ situated each on a choking coil, to the common point $o$ of the secondary system. From $o$ the lead connecting with the negative main of the direct current circuit $N_g$, passes through the series-connected main current exciting windings $Z_{H_1}$, $Z_{H_2}$ and $Z_{H_3}$ which magnetize the choking coils in the same sense as $Z_{A_1}$, $Z_{A_2}$ and $Z_{A_3}$. The choking coils however carry in addition also the direct current exciting windings $Z_{B_1}$, $Z_{B_2}$ and $Z_{B_3}$ which likewise generate direct current fields in the same sense as $Z_{A_1}$, $Z_{A_2}$ and $Z_{A_3}$ respectively.

The series-connected direct current exciting windings $Z_{B_1}$, $Z_{B_2}$ and $Z_{B_3}$ are connected to the rectifier voltage; the regulating resistance R is included in this circuit for the purpose of damping the self-induction L and also for the purpose of regulation. Moreover the compounding is rendered adjustable by means of the regulable shunt resistance $w$.

Figure 6:
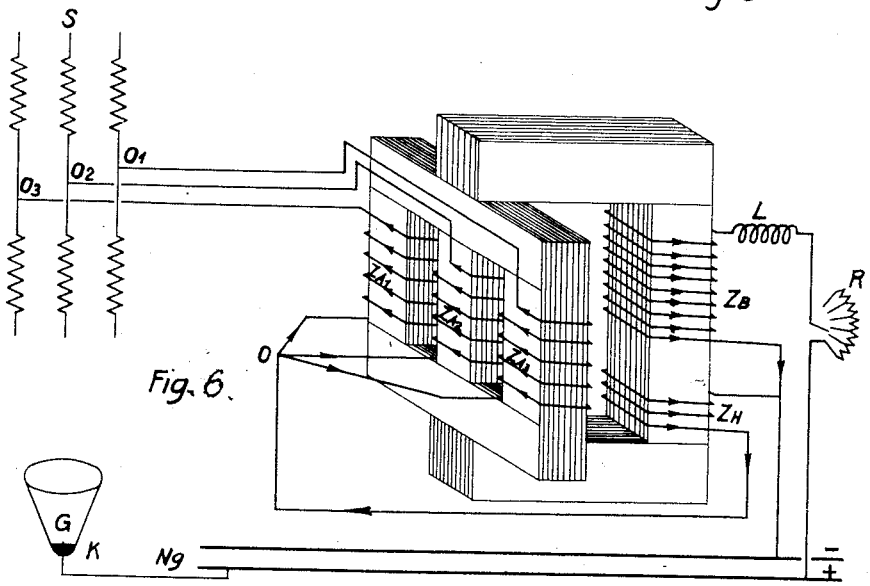

Instead of the magnetically separated three choking coils $D_1$, $D_2$ and $D_3$ of Fig. 5, a common iron core for the anode currents may also be employed in the manner shown in Fig. 6, by providing a fourth leg on which the direct current exciting windings $Z_B$ and $Z_H$ are mounted, both of which magnetize in the same sense as the exciting windings $Z_{A_1}$, $Z_{A_2}$ and $Z_{A_3}$ mounted on the three parallel legs. In this arrangement the number of the exciting windings is smaller, but the magnetic structure is not so simple.

In a polyphase system it is possible to effect a further simplification if the number of the choking coils employed, is reduced by making the number of the secondary phases per group as large as possible, and consequently making the number of the groups as small as possible.

Figure 8:
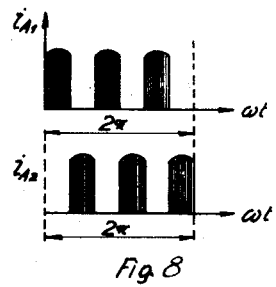
Figure 8 represents the periodic course of the undulating currents in the several exciting windings.
Figure 7:
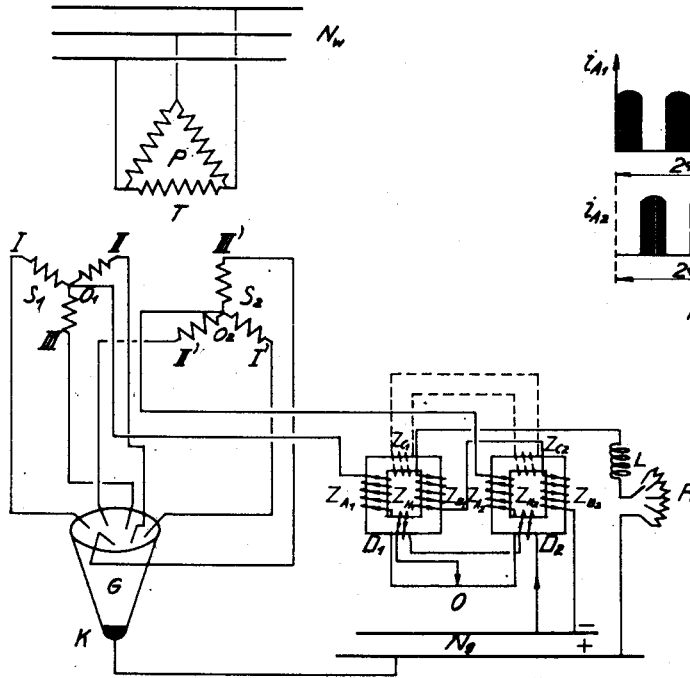
Figure 9:
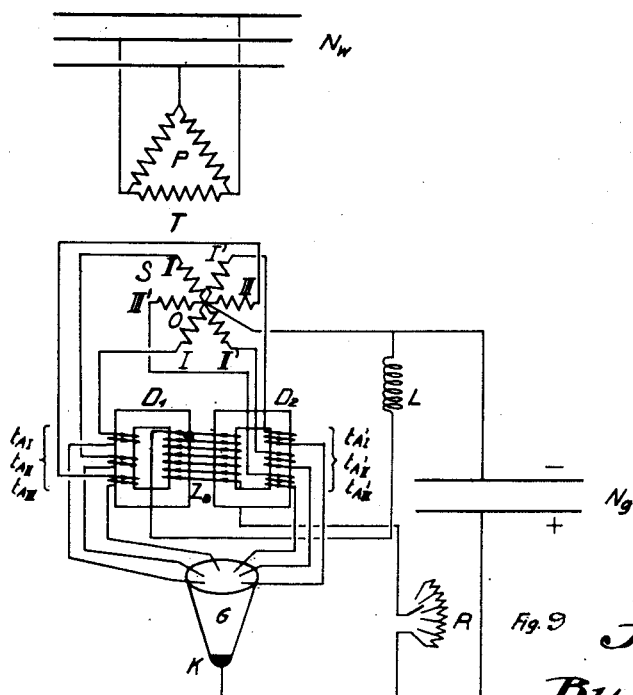

If the number of the secondary phases be numbered in cyclic succession, then the minimum number of groups will be obtained by grouping together the even-numbered phases into one group, and grouping together the odd-numbered phases into a second group. (The grouping together of all phases into a single group is not feasible, because then the exciting winding for the anode current is not traversed by undulating current as is required for voltage regulation, but by a direct current). To each of the two groups formed in this way, there is allotted a choking coil as shown in Figs. 7 and 9. The time-distance of adjacent phases is the same in each group, so that the undulating currents in the several exciting windings have a regular periodic course (Fig. 8).

In Fig. 7, $N_w$ is a three-phase net, and T is a transformer with the primary winding P and the two secondary winding groups $S_1$ and $S_2$, of which $S_1$ comprises the phases I, II, III, whilst $S_2$ comprises the phases I′, II′, III′. The phases of group $S_1$ have the zero point $o_1$; those of group $S_2$ have the zero point $o_2$.

The choking coil $D_1$ is allotted to group $S_1$; the choking coil $D_2$ is allotted to group $S_2$. Whereas now the external terminals of the secondary phases are connected to the anodes of the rectifier G, the zero points $o_1$ and $o_2$ are connected through the exciting windings $Z_{A_1}$ and $Z_{A_2}$ respectively to the common zero point $o$ of the secondary system.

The zero point $o$ is connected to the negative main of the direct current net through the series-connected main current exciting windings $Z_{H_1}$ and $Z_{H_2}$. The direct current exciting windings $Z_{B_1}$ and $Z_{B_2}$ are again connected in the way hereinbefore described to the voltage of the rectifier, and they allow of regulating this voltage by means of the regulating resistance R. There is yet a further winding $Z_{c_1}$ and $Z_{c_2}$ respectively indicated on the choking coils $D_1$ and $D_2$; these windings are connected in series with each other and constitute an electric linking of the choking coils. They serve to influence the voltage at the electrode of the rectifier in such a manner that an unequal distribution of the current over the two groups, and the extinction of the arc of one phase are avoided.

In Fig. 9, the two groups $S_1$ and $S_2$ have only the common zero point $o$, but just as before there are allotted respectively to the phases I, II, III and I', II', III', choking coils $D_1$ and $D_2$, which in this case carry each three exciting windings, acting in the same sense, for the anode currents. In this case, as shown in Fig. 9, it is possible to give the two choking coils a common direct current exciting winding in which the E. M. F.'s induced by the anode currents, approximately neutralize each other.

In the hereinbefore described improved process of regulation, the early saturation of the choking coils plays an important part, because this saturation prevents an undesirable influence of the main current upon the regulated voltage of the direct current net throughout a wide range of load.

What I claim is:—

1. An apparatus for regulating the voltage of metal vapor rectifier installations including a rectifier, a polyphase transformer whose secondary windings are connected to the rectifier anodes and to the rectifier cathode through a direct current network, choking coils in the anode current circuits and an additional coil coacting with the core of said choking coil and wound to magnetize the said core in the same sense as the anode current, said additional coil being connected through an adjustable resistance to the opposite poles of the direct current mains of said installation.

2. An apparatus for regulating the voltage of metal vapor rectifier installations including a rectifier, a polyphase transformer whose secondary windings are connected to the rectifier anodes and to the rectifier cathode through a direct current network, choking coils in the anode current circuits, an additional coil coacting with the core of said choking coil and wound to magnetize the said core in the same sense as the anode current, said additional coil being connected through an adjustable resistance to the opposite poles of the direct current mains of said installation, and an additional coil connected in series in said direct current mains and coacting with the core of said choking coil to magnetize the said core in the same sense as the anode current.

3. An apparatus for regulating the voltage of metal vapor rectifier installations including a rectifier, a polyphase transformer whose secondary windings are connected to the rectifier anodes and to the rectifier cathode through a direct current network and whose secondary phases forming the anode current circuits are allotted in groups of at least two phases which magnetize in the same sense, each group being included in circuit with a choking coil, and an additional coil coacting with the core of said choking coil and wound to magnetize the said core in the same sense as the anode current, said additional coil being connected through an adjustable resistance to the opposite poles of the direct current mains of said installation.

4. An apparatus for regulating the voltage of metal vapor rectifier installations including a rectifier, a polyphase transformer whose secondary windings are connected to the rectifier anodes and to the rectifier cathode through a direct current network and whose secondary phases forming the anode current circuits are allotted in groups of at least two phases which magnetize in the same sense, each group being included in circuit with a choking coil, an additional coil coacting with the core of said choking coil and wound to magnetize the said core in the same sense as the anode current, said additional coil being connected through an adjustable resistance to the opposite poles of the direct current mains of said installation, and an additional coil wound on the core of each choking coil, said latter additional coils being connected together in series.

5. An apparatus for regulating the voltage of metal vapor rectifier installations including a rectifier, a polyphase transformer whose secondary windings are connected to the rectifier anodes and to the rectifier cathode through a direct current network and whose secondary phases forming the anode current circuits are allotted in groups of at least two phases which magnetize in the same sense, each group having a group zero point from which an anode current is led to a choking coil, and an additional coil coacting with the core of said choking coil and wound to magnetize the said core in the same sense as the anode current, said additional coil being connected through an adjustable resistance to the opposite poles of the direct current mains of said installation.

In testimony whereof I have signed my name to this specification.

JULIUS JONAS.